Oct. 11, 1960

R. E. MEYNIG 2,955,614

CONSTANT TUBING PRESSURE CHOKE

Filed March 1, 1956

INVENTOR
*R.E. Meynig*

BY *Mason, Fenwick & Lawrence*
ATTORNEYS

2,955,614
CONSTANT TUBING PRESSURE CHOKE

Robert Edward Meynig, P.O. Box 2147, Beaumont, Tex.

Filed Mar. 1, 1956, Ser. No. 568,812

3 Claims. (Cl. 137—505.13)

The present invention relates in general to fluid regulator and control devices, and more particularly to fluid regulating devices which are automatically responsive to fluid pressure to regulate the flow of fluid therethrough so as to reduce the effective cross-sectional area available for fluid transmission when high pressure conditions occur and increase such area when the pressure falls below preselected pressure levels.

The present invention is adapted for use primarily in connection with oil and gas withdrawing systems associated with producting oil wells as a means for controlling and regulating the flow of fluid from a well in such a manner as to maintain a selected ratio of oil and gas in the flowing or pumping well. It is recognized that it is necessary to check the flow of fluid from a well in which the discharge flow is under the influence of natural gas pressure in order to obtain maximum output of oil with relation to the gas produced. If the well is allowed to flow at too rapid a rate, the gas exhibits a tendency to channel the oil sands, to bring sand into the well, and escape without performing the useful function of raising the optimum quantity of oil. If the fluid being withdrawn from the well is so regulated as to establish too low a rate of flow, the proportion of oil or water in the well which has not been absorbed or is not mixed with a sufficient quantity of gas to lighten the column of fluid, may become too large, which may cause discharge from the well to fail at reduced bottom hole pressures.

It is frequently necessary in connection with oil well operations to adjust the rate of flow of fluid from time to time in order to compensate for variations in the bottom hole pressures which are at times substantial and produce surges as a result of sudden influxes of gas and oil under pressure. Regulation of the flow of fluid from wells being pumped is also desirable for maintaining relative constant flow and preventing intermittent flow which might otherwise take place.

An object of the present invention, therefore, is the provision of means for automatically controlling the flow of fluid from an oil well in response to changes in pressure of the fluid in order to maintain the well in production at selected ratios of oil to gas.

Another object of the present invention is the provision of a device for automatically regulating the flow of fluid from an oil well continuously during operation thereof in response to the fluid pressure to maintain a constant flow of fluid.

Another object of the present invention is the provision of a device for automatically regulating the flow of fluid from an oil well which limits the flow of fluid to a selected extent under conditions of high fluid pressure and offers progressively lower resistance to fluid flow as the fluid pressure reduces to maintain relatively constant fluid flow.

Another object of the present invention is the provision of a device for controlling fluid flow from oil wells which continuously provides a small orifice in a pipe line through which the fluid is drawn and which is responsive to changes in fluid pressure to vary the effective orifice and maintain a substantially constant fluid flow.

Other objects, advantages and capabilities of the present invention will become apparent from the following detail description, taken in conjunction with the accompanying drawing showing one preferred embodiment of the invention.

Figure 2:
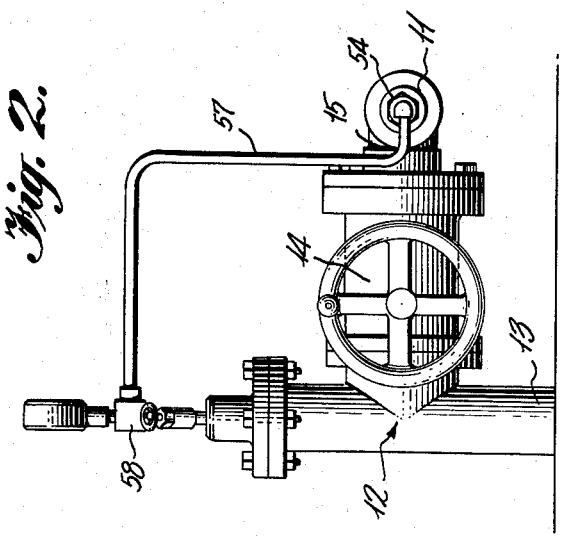
Figure 2 is a side elevation of the well head installation.

Referring to the drawing, wherein like reference characters designate corresponding parts throughout the several figures, the fluid regulating choke of the present invention, indicated generally by the reference character 11, is designed to be assembled with the usual well head 12 at the upper end of a string of casing 13, the well head 12 having the usual wing valve 14 for manually controlling the withdrawal of oil from the well. The choke 11 comprises a body 15 in the form of a T fitting having an inlet passage 16 provided with internal threads 17 connecting with a bore 18 extending entirely through the body 15. The bore 18 is provided with internal screw threads 19 at the outlet end thereof and threads 20 at the opposite end of the bore 18. The central region of the bore serves as a choke chamber 21. The threads 17 of the inlet passage portion of the choke body 15 are designed to be coupled to a threaded fitting on the end of the wing valve extension 14 of the well head 12.

A nipple 22 is assembled with the outlet end threads 19 of the bore 18 by threads an the choke seating end portion 23 of the nipple 22 and is provided with external threads 24 at the other end of the nipple 22 for connection to a flow line pipe. The nipple 22 is provided with a smaller diameter bore 25 extending over the major portion of its length which merges into a larger diameter coaxial bore portion 26 at the choke seating end portion 23 of the nipple. The larger diameter bore portion 26 is internally threaded to receive the threaded stem 27 of a choke seat member 28 having an enlarged head 29 and a bore 30 extending therethrough opening into a seat ring socket 31 in the enlarged head 29. A seating gasket 32 is clamped between the annular shoulders of the enlarged head 29 and the adjacent surface of the nipple 22 in surrounding relation to the stem 27 of the choke seat member 28 to prevent leakage. An annular seat ring 33 is removably seated in the socket 31, the bore of the seat ring being of a selected diameter which is less than the diameter of the bore 25 in the nipple 22.

Disposed within the choke chamber 21 is a choke point member 35 adjacent the choke seat ring 33 and axially reciprocative relative thereto. The choke point member 35 comprises a cylindrical head 36 terminating in a conically tapered nose 37 which is recessed as the apex thereof to receive a removable point insert 38 which is conically tapered to form a continuation of the tapered nose 37 and serves as a valve member cooperating with the seat ring 33. The point insert 38 is provided with an axial bore 39 which communicates with a bore 40 located internally of the member 35 and having a plurality of bleeder passages 41 radiating from the bore 40 through the surface of the member 35 along axes perpendicular to the axis of the member 35.

The choke point member 35 is supported for rectilinear reciprocative movement along its axis by means of a piston rod 42 slidably housed within an elongated piston housing 43 having a threaded end 44 coupled to the threads 20 of the bore 18 and forming the closure for the end of the choke chamber 21 opposite the nipple 22. The piston rod 42 is threaded into a threaded socket in the choke point member 35 and a lock nut 45 is threaded into the rod 42 to securely fix the member 35 onto the end thereof, and a piston 46 having an O-ring 47 seated in a peripheral groove therein is disposed within a bore 48 extending through the major portion of the length of the housing 43 from the free end thereof and forming a cylinder for the piston 46. The end portion of the bore 48 opening through the free end of the housing 43 is threaded, as indicated at 49, to receive a threaded nut 50 having a threaded bore 51 in which a set screw 52 having a bore 53 therethrough is disposed. The bore 53 terminates at the outer end of the set screw in an Allen wrench socket or the like to facilitate adjustment of the set screw 52. The outer end of the bore 51 is closed by a threaded plug 54 having a bore 55 extending therethrough in communication with the bore 51, the plug 54 terminating outwardly in a male union coupling formation 56. The union coupling formation 56 is adapted to be connected to one end of a tube 57, the other end of which is coupled to a fitting 58 on the well head 12 for subjecting the piston 46 to the pressure head in the string of casing 13.

The piston 46 is resiliently biased toward the free end of the housing 43 by a coil spring 59 which surrounds the piston rod 42 with one end bearing against the piston 46 and the other end bearing against the head of an adjusting nut 60 disposed within an enlarged bore 61 communicating with the bore 48. The head of the adjusting nut 60 is provided with spanner wrench sockets 62 and the shank 63 is threaded into a thrust collar 64 which bears against the annular shoulder 65 formed at the inner end of the enlarged bore 61. A bore 66 is provided at the inner end 44 of the housing 43 for accommodating the piston rod 42, in which an O-ring 67 is seated to bear against the rod 42 and seal the bore 66.

Figure 3:
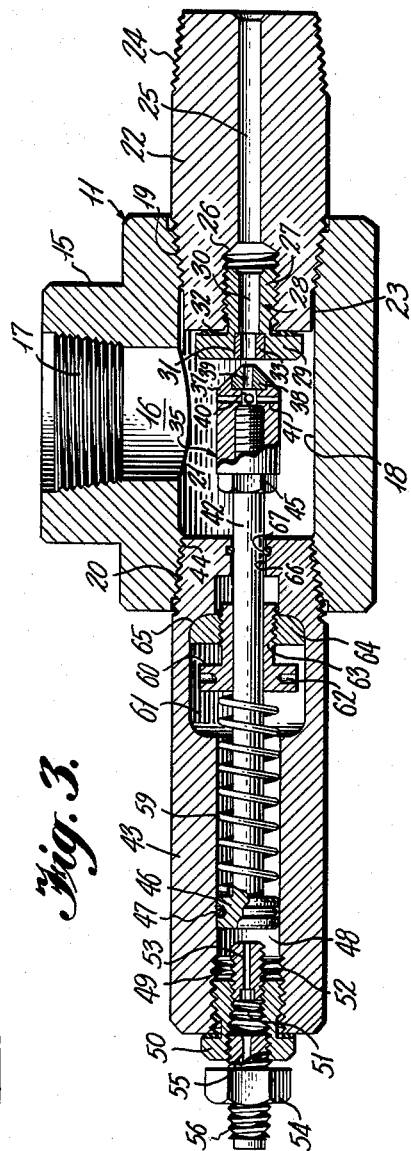
Figure 3 is a longitudinal horizontal section view of the fluid regulating choke, taken along the line 3—3 of Figure 1.
Figure 1:
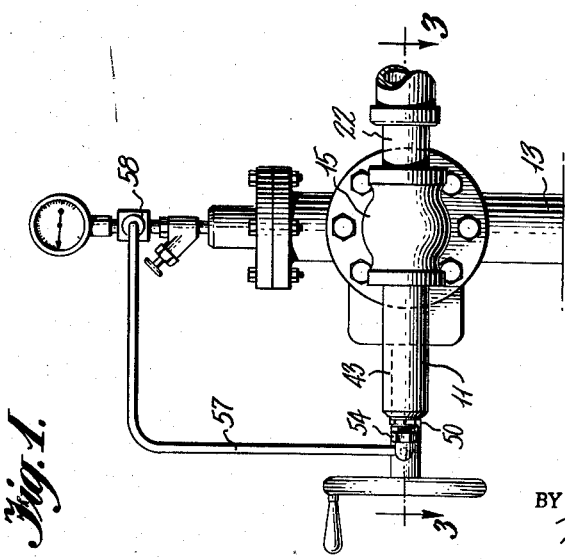
Figure 1 is a front elevation view of a well head installation embodying the present invention.

Prior to assembly of the fluid control choke or the well head, the set screw 52 must be adjusted by means of an Allen head wrench to limit the maximum extent of withdrawal of the nose 37 of the choke point member 35 from the seat ring 33 and the plug 54 threaded into the bore 51 of the nut 50. The adjusting nut 60 must also have been set by a spanner wrench to impart the desired compression to the coil spring 59 to properly oppose tubing pressure on the choke point member 35. During excessive pressure conditions, in the well head, the pressure head on the piston 46 communicated through the tubing 57 and bore 53 of set screw 52 will force the piston toward the right as viewed in Figure 3 and shift the choke point nose 37 into engagement with the seat ring 33. This reduces the rate of flow through the choke for the period that the tubing pressure remains higher than the spring tension, as the oil must flow through the constricted passage provided by the bleeder passages 41 and bores 40 and 39 into the orifice of the seat ring 33 when the tubing pressure decreases to the point where the spring tension on the piston 46 overcomes the tubing pressure on the opposite face of the piston, the spring 59 pulls the nose 37 of the choke point member 35 away from the seat ring 33 to increase the size of the fluid passage communicating with the seat ring and increase the rate of flow. It will be seen that bore 25 in nipple 22, bore 30 in choke seat member 28, and the bore of seat ring 33, together, constitute an outlet passage from the body which has a substantially restricted area as compared with that of inlet passage 16. This outlet passage, being of substantially restricted area, form a main or maximum choke which serves to initially limit the flow of fluid from the well, while choke member 35, with its smaller area passages 39, 40 and 41, forms a minimum or control choke for the main choke passage. Passages 39, 40 and 41 form the sole path of flow between the inlet and the outlet passages when choke member 35 is in engagement with the inner end of the bore of seat ring 33 which constitutes the inlet end of the outlet passage and thus serves to further choke or restrict the flow of fluids through the outlet passages of the bore. By this arrangement, a more or less constant tubing pressure may be automatically maintained in the well and the operator is assured that the well will continue to flow and not load up with fluid and fail. The maximum and minimum choke determined by the settings of the set screw 52 and adjusting nut 61 will assure the operator that the well will not flow with any larger or smaller choke than the selected maximum or minimum chokes, respectively. It will be apparent to those skilled in the art that the above-described unit is also suitable for use as a manually adjustable choke to effect manual regulation of tubing pressure.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. A flow control device for oil and gas wells for use with a well pipe through which well fluids flow to the surface under subsurface pressures, comprising a body having an inlet passage connectible to said pipe and an outlet passage of substantially restricted area as compared with that of said inlet passage, a choke element positioned in the body for reciprocation into and out of closing engagement with the inner end of the outlet passage for regulating fluid flow from said inlet passage through said outlet passage, said choke element having a control passage therethrough providing the sole path of flow between said inlet and outlet passages when in engagement with the inner end of the outlet passage, the area of said control passage being less than that of said outlet passage, resilient means biasing said choke element away from the inner end of said outlet passage, and pressure-responsive means actuatable by a pressure condition in said well pipe for urging said choke element toward engagement with the inner end of said outlet passage in proportion to said pressure condition, whereby to maintain a substantially constant flow of fluid from said well pipe irrespective of the variations in the pressure condition in said well pipe.

2. A flow control device for oil and gas wells for use with a well pipe through which wel fluids flow to the surface under subsurface pressures, comprising a body having an inlet pasage connectible to said pipe and an outlet passage comprising a first choke element having a through-bore of substantially restricted area as compared with that of said inlet passage, a second choke element positioned in the body for reciprocation into and out of closing engagement with the inner end of the through-bore of the first choke element for regulating fluid flow from said inlet pasage through said first choke element, said second choke element having a control passage therethrough providing the sole path of flow between said inlet and outlet passages when in engagement with the inner end of the through-bore, the area of said control passage being less than that of said through-bore, resilient means biasing said second choke element away from the inner end of said first choke element, and pressure-responsive means actuatable by a pressure condition in said well pipe for urging said second choke element toward engagement with the inner end of said first choke element in proportion to said pressure condition, whereby to maintain a substantially constant flow of fluid from said well pipe irrespective of the variations in the pressure condition in said well pipe.

3. A flow control device for oil and gas wells for use with a well pipe through which gases and liquids flow to the surface under subsurface pressures, a body having an inlet passage connectible to said pipe and an outlet passage for discharge of said gases and liquids, a first choke element mounted in said outlet passage, said first choke element having a through-bore of substantially restricted area as compared with that of said inlet passage to form an initial restriction in the flow of said gases and liquids through said outlet passage, a second choke element positioned in the body for reciprocation into and out of closing engagement with the inner end of the through-bore of the first choke element for additionally regulating fluid flow from said inlet passage through said first choke element, said second choke element having a control passage therethrough providing the sole path of flow between said inlet and outlet passages when said second choke element is in engagement with the inner end of said through-bore, the area of said control passage being less than that of said through-bore, resilient means biasing said second choke element away from the inner end of the through-bore of said first choke element, and pressure responsive means connected to said second choke element actuatable by a pressure condition of the gas in said well pipe for urging said second choke element toward engagement with the inner end of said through-bore in proportion to said pressure condition, whereby to maintain a substantially constant flow of liquids from said well pipe irrespective of the variations of the pressure condition in said well pipe.

References Cited in the file of this patent
UNITED STATES PATENTS

| | | |
|---|---|---|
| 385,052 | Hodges | June 26, 1888 |
| 866,503 | Morehart | Sept. 17, 1907 |
| 1,115,244 | Reynolds | Oct. 27, 1914 |
| 1,199,847 | Wilkins | Oct. 3, 1916 |
| 1,430,505 | Hinchman | Sept. 26, 1922 |
| 1,979,910 | Scott | Nov. 6, 1934 |
| 2,091,051 | Mesinger | Aug. 24, 1937 |
| 2,623,331 | Greening | Dec. 30, 1952 |
| 2,766,593 | Mitchell | Oct. 16, 1956 |